US011631869B2

(12) United States Patent
Glueck et al.

(10) Patent No.: US 11,631,869 B2
(45) Date of Patent: Apr. 18, 2023

(54) FLOW PLATE FOR A HUMIDIFIER

(71) Applicant: REINZ-DICHTUNGS-GMBH, Neu-Ulm (DE)

(72) Inventors: Rainer Glueck, Dornstadt (DE); Andre Speidel, Orsenhausen (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 896 days.

(21) Appl. No.: 16/335,628

(22) PCT Filed: Sep. 22, 2017

(86) PCT No.: PCT/EP2017/074126
§ 371 (c)(1),
(2) Date: Mar. 21, 2019

(87) PCT Pub. No.: WO2018/055132
PCT Pub. Date: Mar. 29, 2018

(65) Prior Publication Data
US 2019/0305336 A1     Oct. 3, 2019

(30) Foreign Application Priority Data

Sep. 23, 2016 (DE) .................... 20 2016 105 307.2

(51) Int. Cl.
*H01M 8/04119* (2016.01)
*B01D 53/26* (2006.01)
(Continued)

(52) U.S. Cl.
CPC ...... *H01M 8/04149* (2013.01); *B01D 53/268* (2013.01); *B01D 63/082* (2013.01);
(Continued)

(58) Field of Classification Search
CPC .... B01D 53/268; B01D 63/082; B01D 65/08; B01D 2313/14; F24F 2003/1435; H01M 8/04149
(Continued)

(56) References Cited

U.S. PATENT DOCUMENTS 3,323,653 A     6/1967   Lacey
6,220,497 B1    4/2001   Benz
(Continued)

FOREIGN PATENT DOCUMENTS

CN     101506519 A     8/2009
CN     103392097 A    11/2013
(Continued)

OTHER PUBLICATIONS

European Patent Office, International Search Report and written opinion issued in application PCT/EP2017/074119, dated Nov. 28, 2017, 16 pages.
(Continued)

*Primary Examiner* — Charles S Bushey
(74) *Attorney, Agent, or Firm* — McCoy Russell LLP

(57) ABSTRACT

A flow plate for a humidifier, having flow fields on both mutually opposite flat sides of the flow plate is described. The flow plate proposed here has a multiplicity of through-openings, wherein the through-openings are designed such that a perpendicular projection of the through openings onto a plane oriented parallel to the plane of the flat surface of the flow plate has a non-vanishing area, so that gas passing through the through-openings effects, at least in part, mixing of a gas guided in the flow fields perpendicular to the plane of the flat surface of the flow plate. The through-openings improve the power of the humidifier, thus permitting a lower number of flow plates and therefore a more lightweight and more compact design.

23 Claims, 8 Drawing Sheets

(51) Int. Cl.
 *B01D 65/08* (2006.01)
 *B01D 63/08* (2006.01)
 *F24F 3/14* (2006.01)

(52) U.S. Cl.
 CPC .......... *B01D 65/08* (2013.01); *B01D 2313/14* (2013.01); *F24F 2003/1435* (2013.01)

(58) Field of Classification Search
 USPC ........................................ 261/101, 102, 104
 See application file for complete search history.

(56) References Cited

U.S. PATENT DOCUMENTS

| | | | |
|---|---|---|---|
| 11,069,908 B2* | 7/2021 | Buntz | .................... B01D 65/08 |
| 2005/0233040 A1 | 10/2005 | Ehrfeld | |
| 2010/0326914 A1 | 12/2010 | Drost | |
| 2012/0181712 A1 | 7/2012 | Vanderwees et al. | |
| 2014/0183763 A1* | 7/2014 | Koo | .................. H01M 8/04149 |
| | | | 261/112.2 |
| 2015/0180059 A1 | 6/2015 | Vanderwees | |
| 2015/0314241 A1 | 11/2015 | Hester | |
| 2016/0079615 A1* | 3/2016 | Scherer | ............. H01M 8/04141 |
| | | | 429/413 |
| 2017/0211826 A1* | 7/2017 | Mariotto | ................. F24F 3/147 |
| 2018/0269497 A1* | 9/2018 | Kunz | .................. H01M 8/0267 |
| 2019/0088956 A1* | 3/2019 | Glueck | .............. H01M 8/0271 |
| 2021/0190339 A1* | 6/2021 | Glueck | ............. H01M 8/04149 |

FOREIGN PATENT DOCUMENTS

| | | |
|---|---|---|
| CN | 105143777 A | 12/2015 |
| DE | 3127475 | 4/1982 |
| DE | 102013208877 | 11/2013 |
| DE | 102013004799 | 9/2014 |
| DE | 102014100659 | 7/2015 |
| DE | 202014006480 | 11/2015 |
| DE | 112014002085 T5 | 1/2016 |
| DE | 112014002086 T5 | 1/2016 |
| JP | 2006004638 A | 1/2006 |
| JP | 2006004767 A | 1/2006 |
| JP | 2009026633 A | 2/2009 |
| JP | 2014505336 A | 2/2014 |
| WO | 2008072657 A1 | 6/2008 |
| WO | 2013022945 | 2/2013 |
| WO | 2014033052 | 3/2014 |
| WO | 2016020550 | 2/2016 |

OTHER PUBLICATIONS

European Patent Office, International Search Report and Written Opinion in Application PCT/EP2017/074118, dated Nov. 16, 2017, 14 pages.
China National Intellectual Property Administration, Office Action and Search Report Issued in Application No. 201780072519.2, dated Mar. 8, 2021, 17 pages. (Submitted with Partial Translation).
European Patent Office, International Search Report with Written Opinion issued in PCT/EP2017/074126, dated Nov. 28, 2017, 27 pages, European Patent Office, Rijswijk, Netherlands.

* cited by examiner

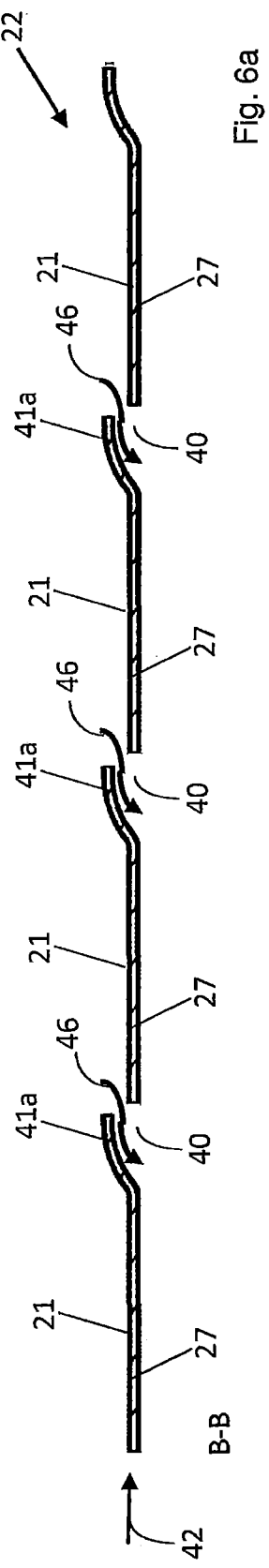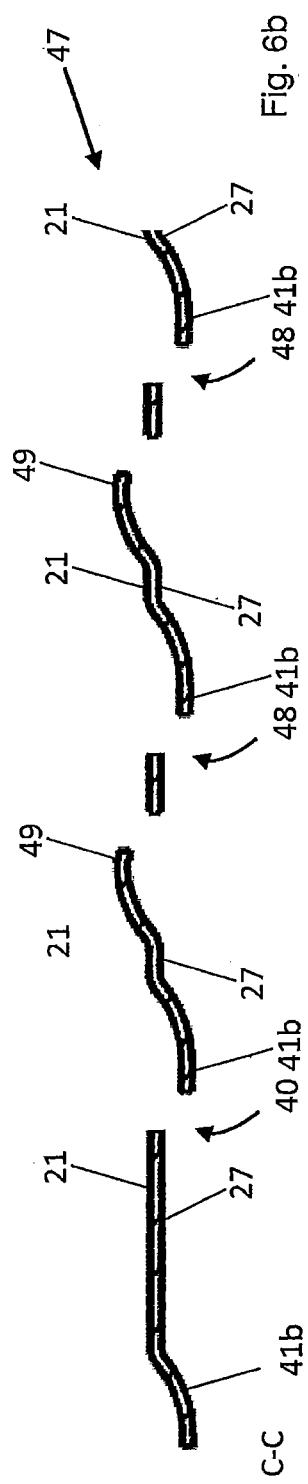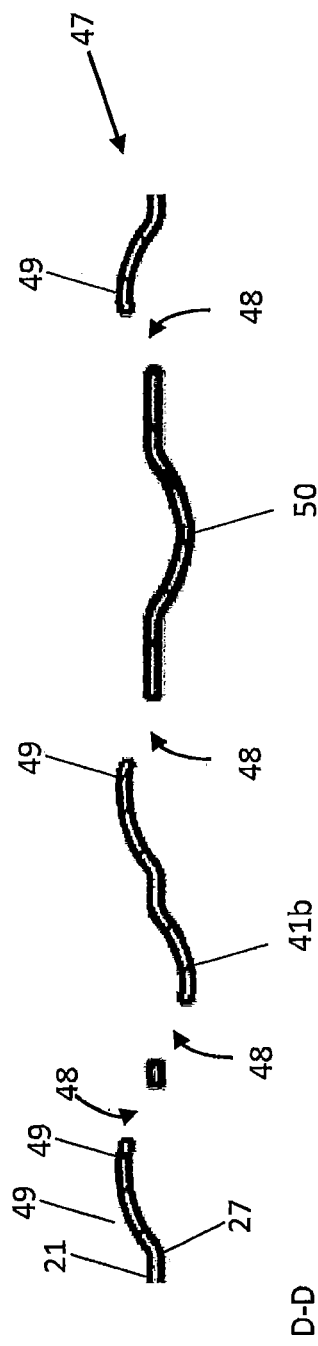

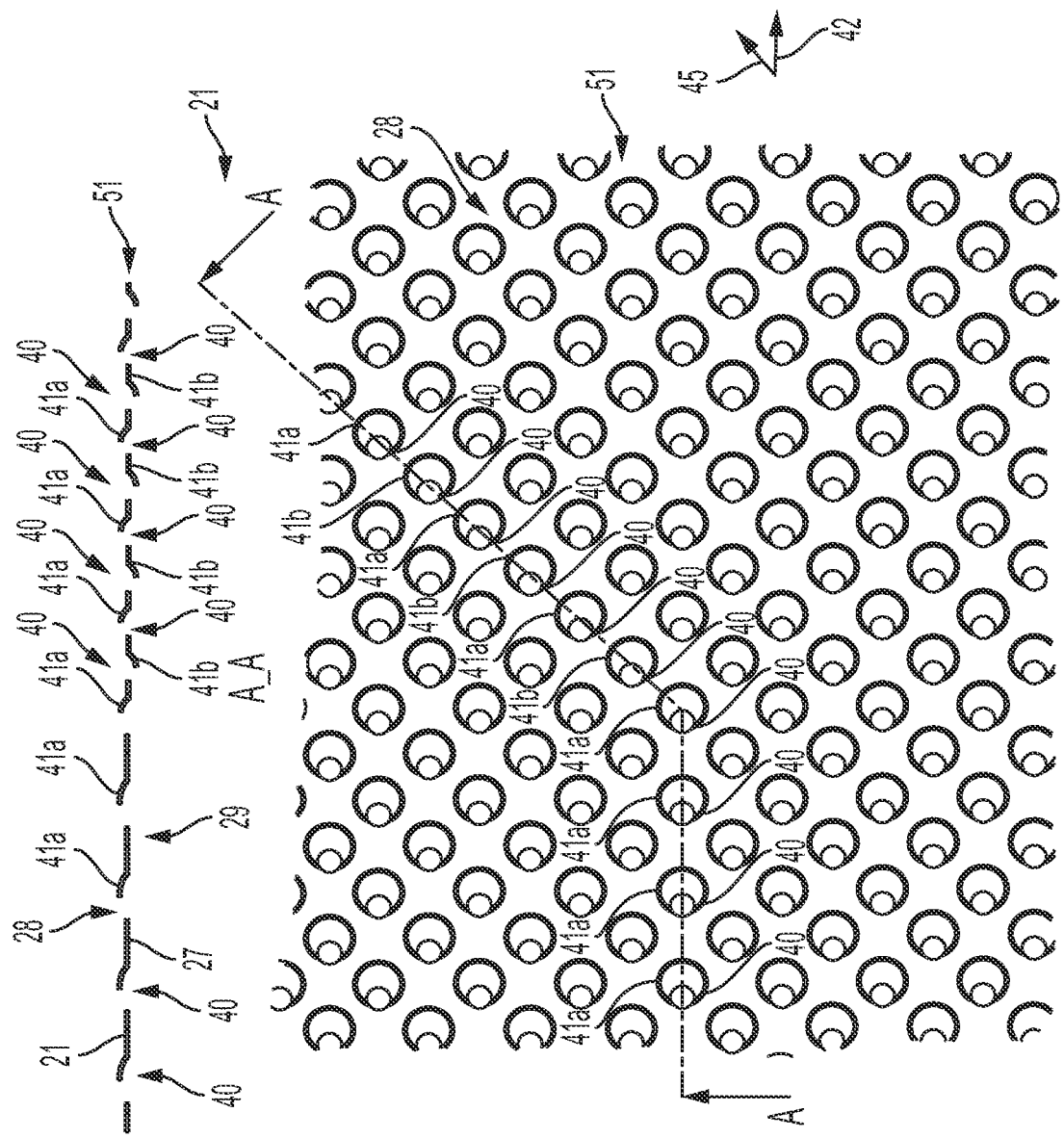

FLOW PLATE FOR A HUMIDIFIER

BACKGROUND

The present application relates to a flow plate for a humidifier, which is preferably used to humidify process gas, and to a humidifier comprising a flow plate of this kind, for example in electrochemical systems. The aforesaid electrochemical systems for example may be fuel cell systems, an electrochemical compressor, an electrolyser, or the like. Besides applications in the field of electrochemical systems, humidifiers can be used for processing air in the field of building technology and air management in vehicles, i.e. in a field summarised by the term "heating, ventilation and air-conditioning" (HVAC).

Humidifiers of this kind are used for example to humidify process gas for fuel cells which are operated with molecular hydrogen and/or oxygen or air for electricity generation. The proton exchange membranes usually used for the operation of fuel cells of this kind require conditions that are as stable as possible with regard to temperature and moisture in order to increase durability and in order to improve efficiency. The process gases supplied to the fuel cell are for this reason usually set to a desired, stable humidity in a humidifier. A humidifier of this kind comprises flow plates which on their flat sides are usually provided with flow fields for guiding a gas. The flow fields can have channel structures for example, wherein the channels adjoin a water transfer medium, typically in the form of a water-permeable membrane or in the form of a membrane composite having a water-permeable membrane.

An assembly of this kind usually provides a plurality of stacked flow plates, between which there are arranged water transfer membranes or membrane composites having water transfer membranes. Besides a water transfer membrane, a membrane composite typically comprises at least one gas diffusion layer or GDL as support medium. For example, a GDL can be arranged on each of the two sides of the transfer membrane. The GDLs can be formed for example as a non-woven fabric, as a woven fabric, or as a multi-ply fabric. An important property of the membranes lies in the fact that they are gas-impermeable, but allow the exchange of moisture between the water transfer membrane and the gas surrounding them.

For example, it may be provided that on one side of a water transfer membrane or a membrane composite a moister gas is guided through the flow field of an adjacent flow plate, and on the opposite side of the water transfer membrane a drier gas is passed through a flow field of a second flow plate. In this case, the moister gas on one side of the water transfer membrane or the membrane composite gives off moisture to the membrane, whereas on the opposite side the membrane gives off moisture to the drier gas. The flow fields arranged on both sides of a water transfer membrane form a humidifier cell together with the water transfer membrane arranged between them or together with the membrane composite arranged between them.

The water transfer membrane accounts for a significant proportion of the costs in the production of the described humidifier, and therefore it is usually sought to minimise the area of the water transfer membranes and thus in any case also the area of the flow plates. The efficient guidance of the gas through the flow fields of the flow plates is therefore of pivotal importance, because a predefined humidity of the gas by transfer of moisture across the membrane must be set reliably over an exchange area minimised to the greatest possible extent.

In this regard, a design of the channels within flow plates of a humidifier that has a favourable influence on the flow of the gas and thus allows a comprehensive moisture exchange with the water transfer membrane is known from the prior art, for example the German utility model specification DE 20 2014 006 480 U1.

SUMMARY

The present innovation, against the background of the prior art, addresses the problem of creating flow plates for a humidifier which enable the exchange of moisture via a water transfer membrane even more efficiently to the greatest extent possible.

What is proposed is thus a flow plate for a humidifier, in particular for a humidifier for humidifying process gas for an electrochemical system or for a humidifier for HVAC applications. On its two mutually opposed flat sides, the flow plate has flow fields for guiding a fluid, in particular for guiding a gas along the flow plate. The flow fields for example may have channel structures. A plurality of through-openings are formed in the flow plate preferably in the region of the flow fields, more specifically in such a way that a perpendicular projection of the through-openings onto a plane oriented parallel to the flat surface plane of the flow plate has a non-vanishing area. For example, the through-openings can be formed in a portion of the flow plate that encloses an angle of less than 90 degrees and preferably more than 0 degrees with the flat surface plane of the flow plate. However, it is also possible that such a portion runs in the flat surface plane of the flow plate or parallel to the flat surface plane of the flow plate.

In this way, the gas passing through the through-openings from the first flow field into the second flow field on the opposite flat side can cause the gas guided in the flow fields to be mixed perpendicularly to the flat surface plane of the flow plate. In particular, this promotes the formation of a homogeneous moisture distribution within the gas guided in the flow fields along the flow plate, perpendicularly to the flat surface plane of the flow plate, and prevents water exchange from occurring only between the plane close to the membrane. In this way, the water transfer rate via an adjacent membrane can be maximised. The areas of the membranes arranged between adjacent flow plates and therefore the costs for producing the humidifier system can thus be significantly reduced.

The flow plate therefore preferably is not used here in the region of the flow fields for the separation of different media. Rather, the same medium usually flows here on both sides of the flow plate on account of the through-openings, i.e. gas to be humidified and then actually humidified in its further course, or moist gas, which develops a lower moisture content in its further course. This can also be referred to as a monopolar design; the gas systems are separated here merely via the water transfer membranes.

The flat surface plane can be defined for example by an edge of the flow plate or by at least three points on the edge of the flow plate not lying in a straight line. It is also conceivable for the flat surface plane of the flow plate to be defined by the plane for which a spacing integral assumes a minimum value, wherein the spacing integral for a given plane is the same as the distance between the flow plate and this plane integrated over the surface of the flow plate. In the case of a plurality of stacked flow plates, for example in a humidifier, flat surface planes of the flow plates are usually oriented perpendicular to the stack direction.

The flow plate can be formed from metal, preferably from stainless steel. For example, it can be formed as a metal sheet with a thickness, determined perpendicular to its flat surface plane, of at most 150 µm, preferably of at most 100 µm, particularly preferably of at most 80 µm. Metal has an advantageously low coefficient of thermal expansion, whereby mechanical stresses occurring in the event of temperature fluctuations during operation of the humidifier can be minimised. This can improve in particular the service life of the water transfer membranes of the humidifier. It is also advantageous if the flow plate is formed in one layer. This reduces the weight of the humidifier and the material costs incurred for production thereof. For micro sealing or for protection against corrosion, the flow plate may additionally be coated completely or at least partially, for example by a hydrophilic or a hydrophobic coating.

The flow plates may also have guide structures, which are arranged and designed in such a way that they guide a gas flowing along a flat side of the flow plate in the region of the flow fields through the through-openings to the flow field or into the flow field on the opposite flat side of the flow plate. The mixing of the gas perpendicular to the flat surface plane of the flow plate can thus be further improved.

The flow plate and the guide structures can be formed in particular in one part, that is to say formed from one piece. This can simplify the production of the plate significantly and can reduce the production costs. For example, the guide structures can be moulded into the flow plate, for example by stamping or by deep drawing.

The guide structures can be arranged and designed in such a way that they reach the through-openings. Guide structures can thus guide the gas flowing along the surface of the flow plate particularly efficiently through the through-openings to the opposite surface of the plate. However, embodiments are also conceivable in which the guide structures or at least some of the guide structures are distanced from the through-openings. For example, the guide structures in this case can be arranged and designed in such a way that they at least partially block the flow of gas.

The through-openings or at least some of the through-openings can be stamped into the flow plate. It is also conceivable that the through-openings or at least some of the through-openings are formed by incisions in the flow plate, in particular by non-material-removing incisions, for example by a linear incision, which is opened either as it is cut in or subsequently. For example, tongue-like, rib-like guide structures which are dome-like or half-shell-like at least in sections can be formed in the flow plate by incisions of this kind and by deforming a region adjacent to the incisions. In order to form the through-openings, these can be bent out from the flat surface plane of the flow plate, at least in some regions, or can protrude from the flow plate. The guide structures or at least some of them may also be formed as ribs. The through-openings may then be provided for example by open side flanks of these ribs.

In particular, the guide structures may enclose an angle of at least 45 degrees, preferably of at least 75 degrees, particularly preferably of at least 80 degrees with the flat surface plane of the flow plate, in each case at least in sections. For a height H of the guide structures determined perpendicularly to the flat surface plane of the flow plate, the following may apply: $0.5 \cdot \leq H \leq 10 \cdot D$, preferably $2 \cdot \leq H \leq 5 \cdot D$, wherein D is the thickness of the flow plate, for example the sheet thickness thereof.

In order to support a water exchange membrane or a membrane composite adjacent to the flow plate, in particular in the region of the flow field, the guide structures at their ends remote from the flow plate may be oriented, at least in sections, parallel to the flat surface plane of the flow plate and/or may be bent over towards the flow plate. For example, damage to the membrane or the membrane composite by the guide structures can thus also be avoided.

The flow plate may have guide structures on both flat sides of the flow plate. The flow plate may thus comprise first guide structures and second guide structures, wherein the first guide structures protrude from the flow plate on the first flat side, and wherein the second guide structures protrude from the flow plate on the second flat side opposite the first flat side. The first guide structures can then guide the gas from the first flat side, through the through-openings, to the second flat side, and the second guide structures can guide the gas from the second flat side, through the through-openings, to the first flat side. The mixing of the gas can thus be further promoted. The flow behaviour and the mixing of the gas are usually improved as a result.

The through-openings and/or the guide structures can be arranged at periodic distances from one another. For example, the through-openings and/or the guide structures can be arranged at periodic distances from one another parallel to the flat surface plane of the flow plate along a first direction and along a second direction. A first distance between adjacent through-openings and/or adjacent guide structures determined along the first direction may then be different from a second distance between adjacent through-openings and/or adjacent guide structures determined along the second direction. The first direction and the second direction may be perpendicular to one another, but may also enclose an angle of less than 90 degrees. The first guide structures protruding from the first flat side of the flow plate and the second guide structures protruding from the second flat side of the flow plate can be arranged alternately along the first direction and/or along the second direction.

In order to further improve a mixing of gas guided along the plate surface, the guide structures can be formed in such a way that a cross-section of the guide structures determined parallel to the flat surface plane of the flow plate is variable perpendicularly to the flat surface plane of the flow plate. For example, gas flowing past the guide structures can be deflected at least partially transversely to the flat surface plane of the flow plate.

In order to guide a gas to be humidified and a humidified gas, or in order to guide a gas to be dehumidified and a dehumidified gas through the flow plate, the flow plate may also have discharge openings, wherein the discharge openings are fluidically connected to the flow fields. The discharge openings are usually arranged in the edge region of the flow plate, in particular in the corner regions. If a plurality of flow plates is stacked in the humidifier, the discharge openings form lines which extend through the stack in the stack direction. Via these lines the humidifier cells can be supplied with gas to be humidified or with gas to be dehumidified. Dehumidified or humidified gas can also be removed from the humidifier cells via these lines. The discharge openings are thus usually fluidically connected to gas ports on an outer side of the humidifier, for example on at least one of the end plates thereof. A cross-section of an individual discharge opening is usually a number of times larger than a cross-section of the individual through-openings, for example at least 10 times or at least 20 times larger.

In order to seal the flow fields and/or the discharge openings, the flow plate may also have seal assemblies, for example in the form of beads moulded into the flow plate. In particular, the seal assemblies can be arranged around the flow fields and/or around the discharge openings and can enclose these. In order to produce a fluidic connection between the discharge openings and the flow fields, the seal assemblies or the beads may have apertures. Gas can be guided via these apertures through the seal assemblies from the discharge openings into the flow fields or from the flow fields to the discharge openings. Alternatively, it is also possible to apply or to attach seals in the form of elastomer elements.

A humidifier is also proposed, in particular for humidifying process gas for an electrochemical system or for HVAC applications. The humidifier has a plurality of stacked flow plates of the described kind. A humidifier of this kind is characterised by a particularly high level of efficiency alongside great compactness and low production costs.

A water exchange membrane or a membrane composite is usually arranged between adjacent flow plates of the stack. As described at the outset, the membrane composite, besides the water exchange membrane, may have at least one gas diffusion layer as support medium, preferably two gas diffusion layers, which are arranged one on each side of the water exchange membrane.

BRIEF DESCRIPTION OF THE DRAWINGS

Exemplary embodiments of the present innovation will be presented in the figures and will be explained in greater detail with reference to the following description. In the figures:

FIG. 6a shows a sectional illustration of the flow plate according to FIG. 4;

FIGS. 6b and 6c show sectional illustrations of the flow plate according to FIG. 5;

FIG. 7 shows a detail of a further embodiment of a flow plate according to the invention for a humidifier;

DETAILED DESCRIPTION

Figure 1:
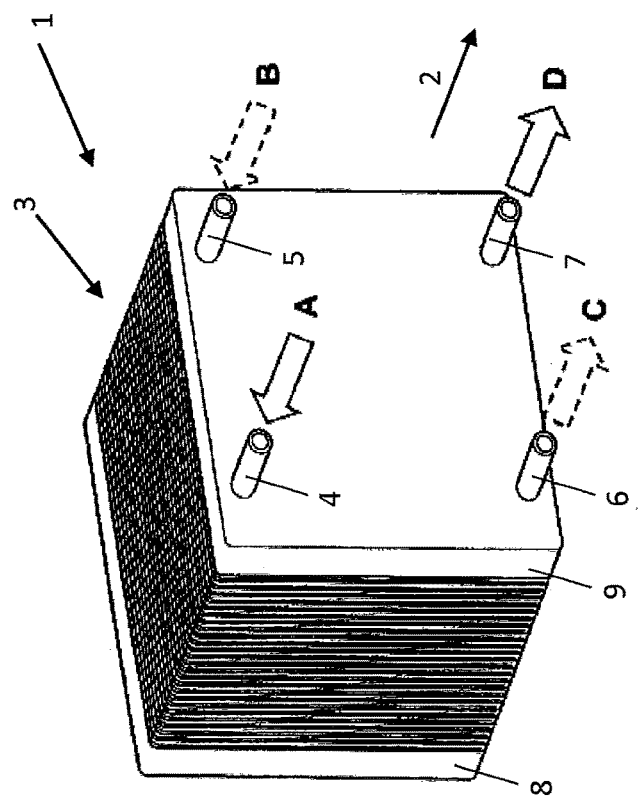
FIG. 1 shows a humidifier with a plurality of stacked humidifier cells.

FIG. 1 shows, in a perspective illustration, a block-shaped humidifier 1 with humidifier cells 3 which are stacked in the stack direction 2 and which each contain at least one flow plate and one water exchange membrane, wherein the humidifier cells are connected to one another by discharge openings, which are aligned in the stack direction 2 and which open out into outwardly guiding gas ports 4, 5, 6, 7. Gas ports 4, 5, 6, 7 penetrate through one of the end plates 8, 9 of the humidifier 1. The gas inlets are provided here with the reference signs 4 and 5, and the gas outlets are provided with reference signs 6 and 7. The corresponding gas flow directions are denoted by A, B, C, D.

The individual humidifier cells 3 stacked in the humidifier 1 each have the same outer dimensions, such that a cube with flat side faces is created by the stack.

Figure 2:
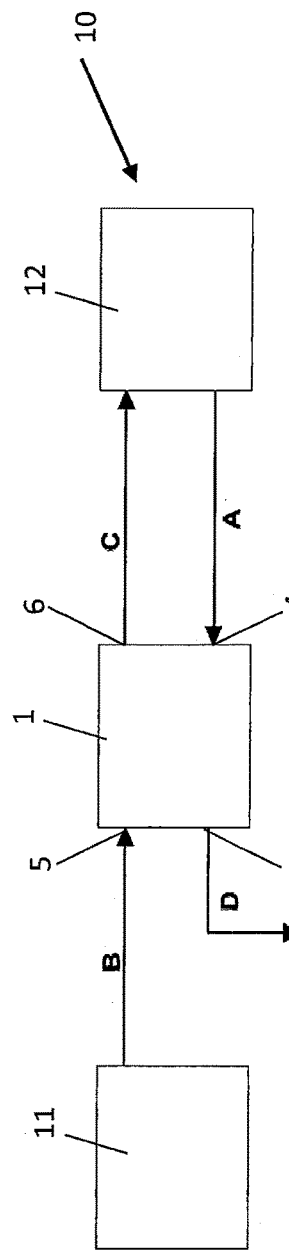
FIG. 2 shows an electrochemical system with the humidifier according to FIG. 1.

FIG. 2 shows schematically an electrochemical system 10 with a compressor 11, a humidifier 1, and a fuel cell stack 12, which for example comprises a plurality of hydrogen/oxygen fuel cells. Here and hereinafter, recurrent features will be denoted by the same reference signs. A dry process gas to be humidified, for example molecular hydrogen or molecular oxygen or air, is supplied by the compressor 11 to the humidifier 1 via a first inlet 5 of the humidifier 1. The process gas humidified in the humidifier 1 is then delivered via a first outlet 6 of the humidifier 1 to the fuel cell stack 12. There, the chemical energy of different process gases is converted into electrical energy by means of a plurality of membrane electrode units. The exhaust air with the water created during the reaction of the process gases in the fuel cell stack 12 is supplied to the humidifier 1 via a second inlet 4 and is used there to humidify the dry process gas, which is supplied to the humidifier 1 via the first inlet 5, through a water exchange membrane. The dehumidified gas is delivered for example to the surrounding environment via a second outlet 7 of the humidifier 1.

The capital letters from FIG. 2 correspond to the gas flow directions which are also denoted in FIG. 1 and are explained in the corresponding text in conjunction with the gas ports.

Figure 3:
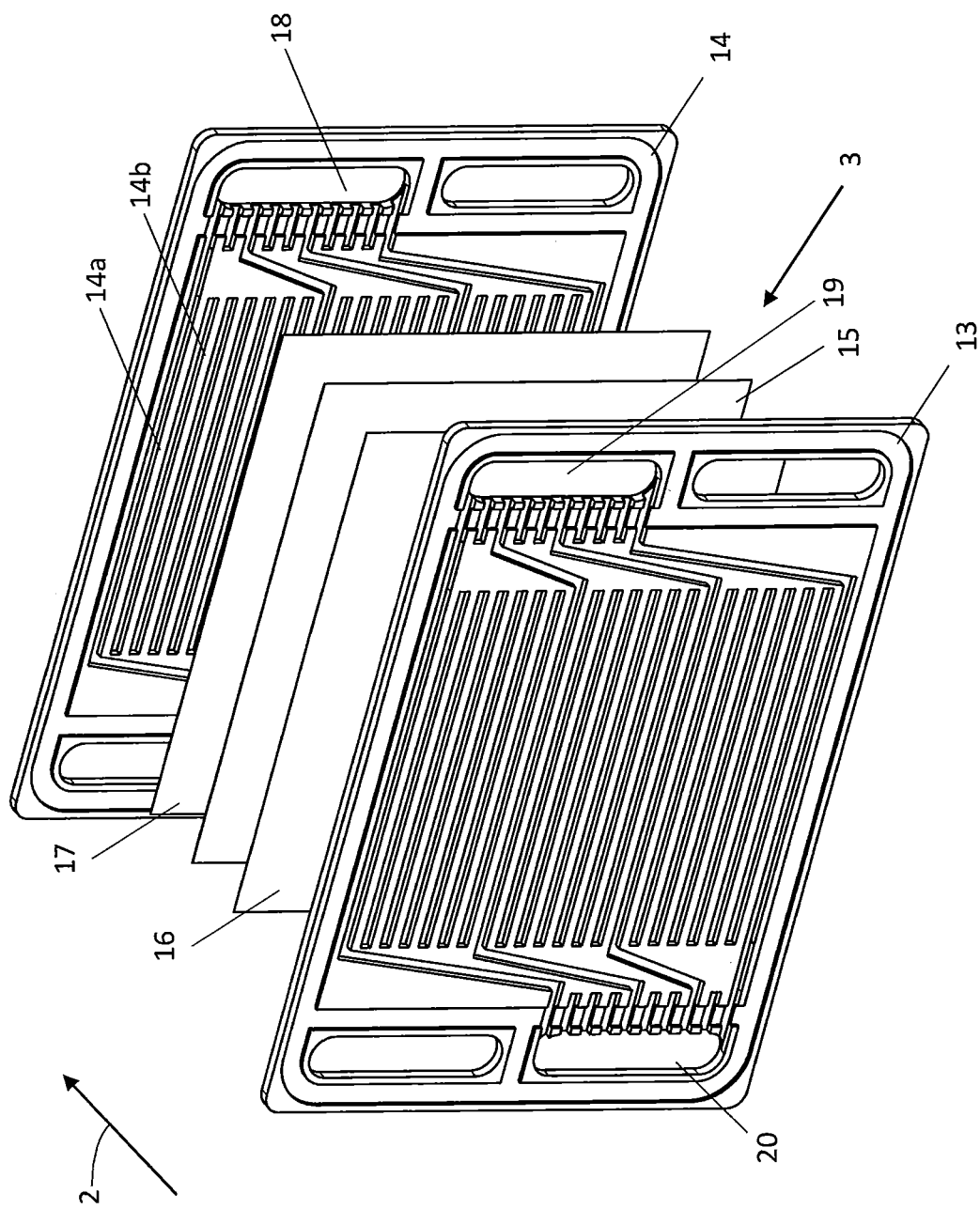
FIG. 3 shows flow plates known from the prior art for a humidifier, and a membrane composite arranged between the flow plates.

FIG. 3 shows, in a perspective illustration, a humidifier cell 3 known from the prior art and comprising, in the described case, two flow plates 13, 14 and a water exchange membrane 15 arranged therebetween, and two support media 16, 17 in the form of non-woven fabrics supporting the water exchange membrane 15 on both sides. The edge regions of the water exchange membrane 15 and the support media 16, 17 are not shown here in the illustration.

The flow plates 13, 14 each have channels at least on one of their sides, said channels being separated from one another by ribs 14a, 14b. The ribs 14a, 14b separating adjacent channels from one another can contact the support media 16, 17, such that channels closed on all sides are created for the flow of a gas along the flow plate within the humidifier cell 3. Gas is supplied to the individual flow plates via the discharge openings 18, 19 and can be removed again via further discharge openings 20 after having passed through the corresponding flow plate. Each flow plate 13, 14 for this purpose has four discharge openings in the shown example, wherein in each case two of these are arranged mutually oppositely and are associated with one flat side of the flow plate. The two other discharge openings are in each case associated with the opposite flat side and the channels running there, although these are not visible in FIG. 3. The flow plates 13, 14 are, when a humidifier is assembled, stacked in such a way that the discharge openings 18, 19 are aligned with one another and form a line for supplying gas to all flow plates. On the opposite side, a further line for removing gas from the flow plates 13, 14 is formed by the aligned discharge openings.

In the humidifier cell 3 shown in FIG. 3, gas flows, in a substantially laminar manner, in the channels of the flow plates 13, 14, which are arranged one on each side of the water exchange membrane 15 and which are each adjacent to the membrane 15. This may cause a stationary moisture gradient to be set within the channels along the stack direction 2, that is to say perpendicular to the flat surface planes of the flow plates 13, 14, more specifically in such a way that the humidity on the moist side of the humidifier cell 3 decreases towards the water exchange membrane 15, and the humidity on the dry side of the humidifier cell 3 increases towards the water exchange membrane 15. Since the water transfer rate via the water exchange membrane 15 is scaled approximately proportionally to the moisture difference present directly at the membrane 15, the described design of a stationary moisture gradient in the channels adjacent to the membrane 15 leads to an undesirable reduction of the water transfer rate. This solution from the prior art shown in FIG. 3 therefore constitutes a non-optimised embodiment, which shall be improved by the present innovation.

Figure 4:
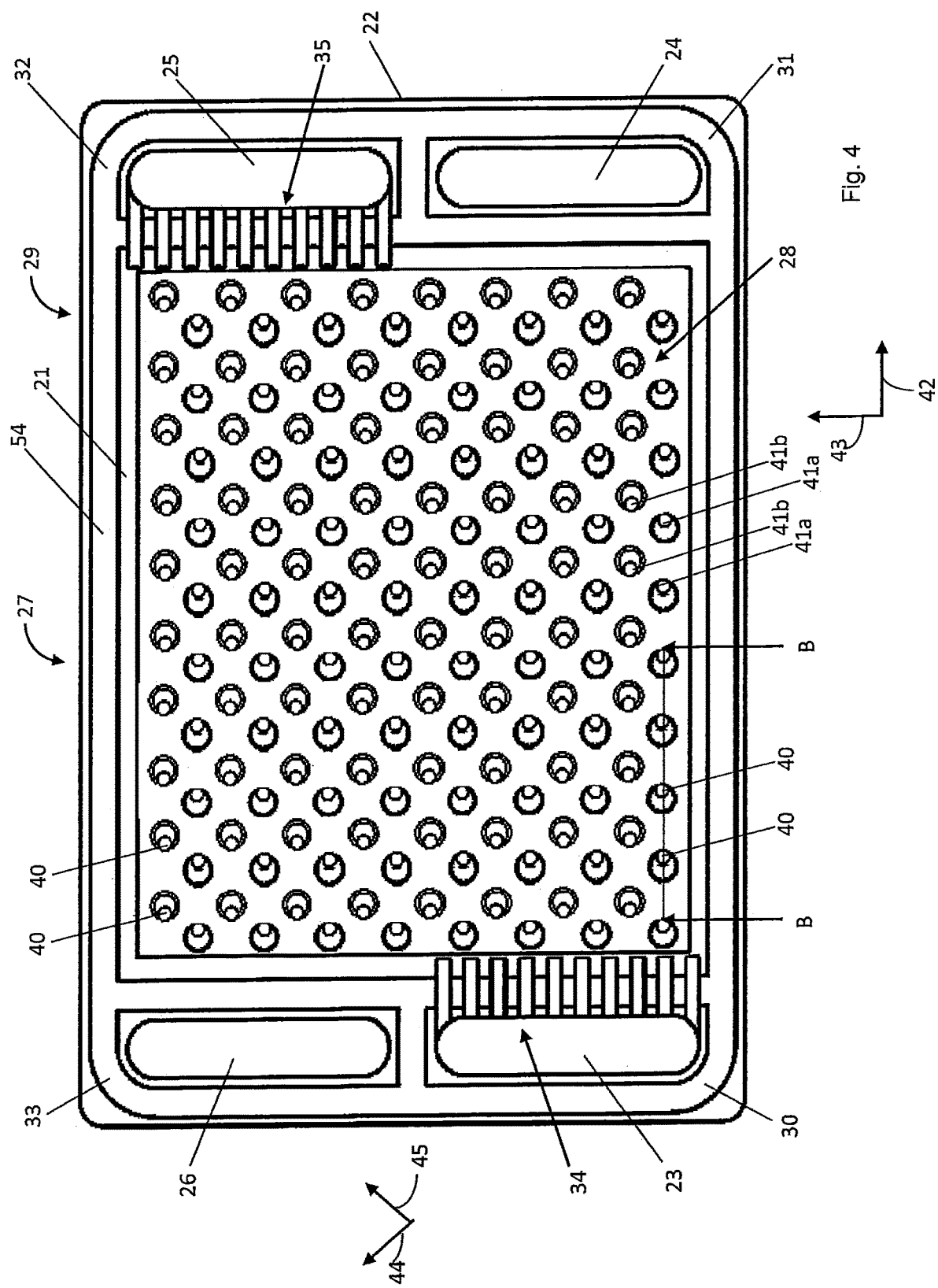
FIG. 4 shows an embodiment of a flow plate for a humidifier according to the invention.

FIG. 4 shows a plan view of a first flat side 21 of a single-layer flow plate 22 according to the invention with discharge openings 23, 24, 25, 26. The flow plate 22 is formed as a stainless steel sheet with a sheet thickness for example of less than 100 µm. The flow plate 22 is part of the plate stack of the humidifier 1 from FIG. 1. The discharge openings 23, 24, 25, 26 are each sealed outwardly and towards the interior of the humidifier 1 by sealing beads 30, 31, 32, 33. The flow field 28 is also surrounded by a sealing bead 54, which seals the flow field 28 outwardly and towards the discharge openings 23, 24, 25, 26, wherein the beads are only suggested here. The sealing beads 30, 31, 32, 33 transition into the sealing bead 54. The discharge opening 25 is fluidically connected to the inlet 5, via which dry gas from the compressor 11 is introduced into the humidifier 1. The discharge opening 23 is fluidically connected to the outlet 6 of the humidifier 1 (see FIGS. 1 and 2), via which humidified gas is discharged from the humidifier 1 and is supplied to the fuel cell stack 12. The discharge opening 26 is fluidically connected to the inlet 4, via which water vapour from the fuel cell stack 12 is introduced into the humidifier 1. The discharge opening 24 is fluidically connected to the outlet 7, via which dehumidified water vapour from the humidifier 1 is released into the surrounding environment.

A second flat side 27 on the rear side of the flow plate 22 facing away from the viewer is hidden in FIG. 4. A first flow field 28 is arranged between the discharge openings 25 and 23 on the first flat side 21. The discharge openings 23, 25 are fluidically connected to the first flow field 28 via apertures 34, 35 in the bead arrangements 30, 32. Accordingly, a second flow field 29, which is likewise hidden in FIG. 4, is arranged between the same discharge openings 23 and 25 on the second flat side 27. This second flow field 29 is also fluidically connected to the discharge openings 23, 25. During operation of the humidifier 1, dry gas that is to be humidified and that is supplied to the flow plate 22 via the discharge opening 25 flows through the flow fields 28, 29 on each side of the flow plate 22 towards the discharge opening 23. In the region of the flow fields 28, 29, the dry gas flowing to the discharge opening 23 then takes on moisture via water transfer membranes (not shown), which on each side of the flow plate 22 are adjacent to the first flat side 21 and the second flat side 27. Gas diffusion layers may also be arranged optionally between the water transfer membranes and the flat sides 21, 27 of the flow plate. The gas humidified in such a way in the region of the flow fields 28, 29 is then discharged again from the flow plate 22 via the discharge opening 23. The discharge openings 24, 26 are used to guide moist gas or to discharge dehumidified gas and are not fluidically connected to the flow fields 28, 29 of the flow plate 22, since the sealing beads 31, 32 surrounding them do not have any apertures.

Flow plates of the humidifier 1 which are designed to guide moist gas can be formed in accordance with the flow plate 22. In contrast to the flow plate 22 shown in FIG. 4, the discharge openings guiding the moist gas are however then fluidically connected to the flow fields on the flat sides of the flow plate, whereas the discharge openings guiding the dry gas are not fluidically connected to the flow fields. In the humidifier 1, flow plates of the kind of the flow plate 22 for guiding dry gas and flow plates for guiding moist gas are arranged alternately.

In FIG. 4 the flow fields 28, 29 on the two flat sides 21, 27 of the flow plate 22 are fluidically connected to one another by a plurality of through-openings 40. Gas flowing along the flat sides 21, 27, over its path from the discharge opening 25 to the discharge opening 23, can then flow continuously through from the first flow field 28 into the second flow field 29 and from the second flow field 29 into the first flow field 28 through the through-openings 40. For the sake of clarity, only some of the through-openings 40 have been provided with reference signs in FIG. 4. The through-openings 40 are formed in such a way that a perpendicular projection of the through-openings 40 onto the flat surface plane of the flow plate 22, which in FIG. 4 is oriented parallel to the drawing plane, has a non-vanishing area. For example, the projections of the through-openings 40 onto the flat surface plane of the flow plate 22 each have an area of at least 0.2 mm$^2$ or of at least 0.5 mm$^2$. However, they may also be much greater, for example between 1 mm$^2$ and 3.5 mm$^2$. As a result of this design of the through-openings 40, the gas flowing in the flow fields 28, 29, as it passes through the through-openings 40, has a speed component perpendicular to the flat surface plane of the flow plate 22, i.e. along the stack direction 2 (see FIGS. 1 and 3), such that during operation the gas and the moisture entrained by the gas and taken up in the region of the flow fields 28, 29 mix perpendicularly to the flat surface plane of the flow plate 22. As described previously, this mixing causes an increase of the water transfer rate and the efficiency of the humidifier 1.

The through-openings 40 are for example stamped into or out of the flow plate 22. Is also conceivable for the through-openings 40 to be formed by non-material-removing, i.e. linear cutting of the flow plate 22 and by subsequent forming of the flow plate 22 in the region of the incisions. In order to guide the gas flowing in the flow fields 28, 29 through the through-openings 40 and to the other flat side 21, 27 purposefully at an incline, the flow plate 22 on the first flat side 21 has a plurality of first guide structures 41$a$ in the region of the first flow field 28 and on the second flat side 27 has a plurality of second guide structures 41$b$ in the region of the second flow field 29.

The guide structures 41$a$, 41$b$ are formed in each case by deformations in regions of the flow plate 22 adjacent to the through-opening. In FIG. 4 the guide structures 41$a$, 41$b$ each form elevations which are dome-like, spherical or half-shell-like at least in sections and which protrude on each side of the flow plate 22 from the flat sides 21, 27 of the flow plate 22. The first guide structures 41$a$ protrude from the first flat side 21 facing towards the viewer, and the second guide structures 41$b$ protrude from the second flat side 27 facing away from the viewer. For example, the guide structures 41$a$, 41$b$ each protrude from the flat sides 21, 27 by at least 1.5 times the sheet thickness.

With the exception of the portion of the dome-like guide structures 41$a$, 41$b$ in which they border the through-openings 40, the guide structures 41$a$, 41$b$ have, parallel to the flat surface plane of the flow plate 22, an approximately circular cross-section, which changes, in particular tapers, perpendicularly to the flat surface plane of the flow plate 22 with increasing distance from the flat surface plane. A speed component perpendicular to the flat surface plane of the flow plate 22 is thus additionally impressed on the gas flowing along the flat sides 21, 27, additionally promoting the mixing of the gas in this direction. Neither the through-openings 40 nor the guide structures 41a, 41b are here shown necessarily to scale relative to the other structures of the flow plate 22, such as the discharge openings 23, 25. In practice, they tend to be smaller. The size in the illustration has been selected for easier comprehension. The through-openings 40 and the guide structures 41a, 41b are shown to scale relative to one another.

The through-openings 40 and the guide structures 41a, 41b are arranged in a grid at regular distances along two directions 42, 43 which are perpendicular to one another and which are each oriented parallel to the straight outer edges of the rectangular flow plate 22. Here, the distances between adjacent through-openings 40 and guide structures 41a, 41b are identical in both directions 42, 43. In alternative embodiments the distances in both directions 42, 43 may also be different. In addition, the grid-like arrangement of the through-openings 40 and of the guide structures 41a, 41b has further directions of symmetry 44, 45, which in each case enclose an angle of approximately 45 degrees with the aforementioned directions 42, 43. Also along the directions 44, 45, the through-openings 40 and the guide structures 41a, 41b are arranged at regular distances. In particular, the first guide structures 41a and the second guide structures 41b are arranged alternately along the directions 44, 45 running at an incline to the outer edges of the flow plates. This arrangement can mean that the gas switching between the flow fields 28, 29 flows approximately to the same extent from the first flow field 28 into the second flow field 29 as in the reverse direction. The formation of local pressure differences, which could negatively influence the flow behaviour and the mixing of the gas, can thus be prevented.

It can additionally be seen that the through-openings 40, along the direction 42 or approximately along the flow direction of the gas from the discharge opening 25 serving as a gas inlet to the discharge opening 23 serving as a gas outlet, are arranged at opposite ends of the first guide structures 41a and the second guide structures 41b. The through-openings 40 along the direction 42 thus form the end of the first guide structures 41a facing the discharge opening 25 serving as a gas inlet. By contrast, the through-openings 40 along the direction 42 form the end of the second guide structures 41b facing the discharge opening 23 serving as a gas outlet. In alternative embodiments other arrangements of the through-openings 40 relative to the guide structures 41a, 41b are also conceivable. For example, the through-openings 40 could likewise adjoin the end of the first guide structures 41a and of the second guide structures 41b facing the discharge opening 23 serving as gas outlet (see FIG. 7).

In order to explain the geometry of the first guide structures 41a on the first flat side 21 of the flow plate 22 from FIG. 4, a section through the flow plate 22 along the line of section B-B is shown in FIG. 6a. What are shown are the first flat side 21, the second flat side 27, the through-openings 40 arranged at regular distances along the direction 42, and the first guide structures 41a, which are arranged at regular distances along the direction 42 and which directly reach as far as the through-openings 40. The through-openings 40, as can be clearly seen, produce a fluidic connection between the first flow field 28 on the first flat side 21 and the second flow field 29 on the second flat side 27. The first guide structures 41a protrude from the first flat side 21, more specifically approximately by three times the sheet thickness. As a result of the convexity of the first guide structures 41a in relation to the flat side 21, a speed component oriented perpendicularly to the flat surface plane of the flow plate 22 is impressed on the gas flowing from the first flow field 28 on the first flat side 21 into the second flow field 29 on the second flat side 29, as said gas passes through the through-openings 40 adjoining the first guide structures 41a. The flow of the gas through the through-openings 40 and the guiding effect of the first guide structures 41a is shown by way of example by flow arrows 46 in FIG. 6a.

Figure 5:
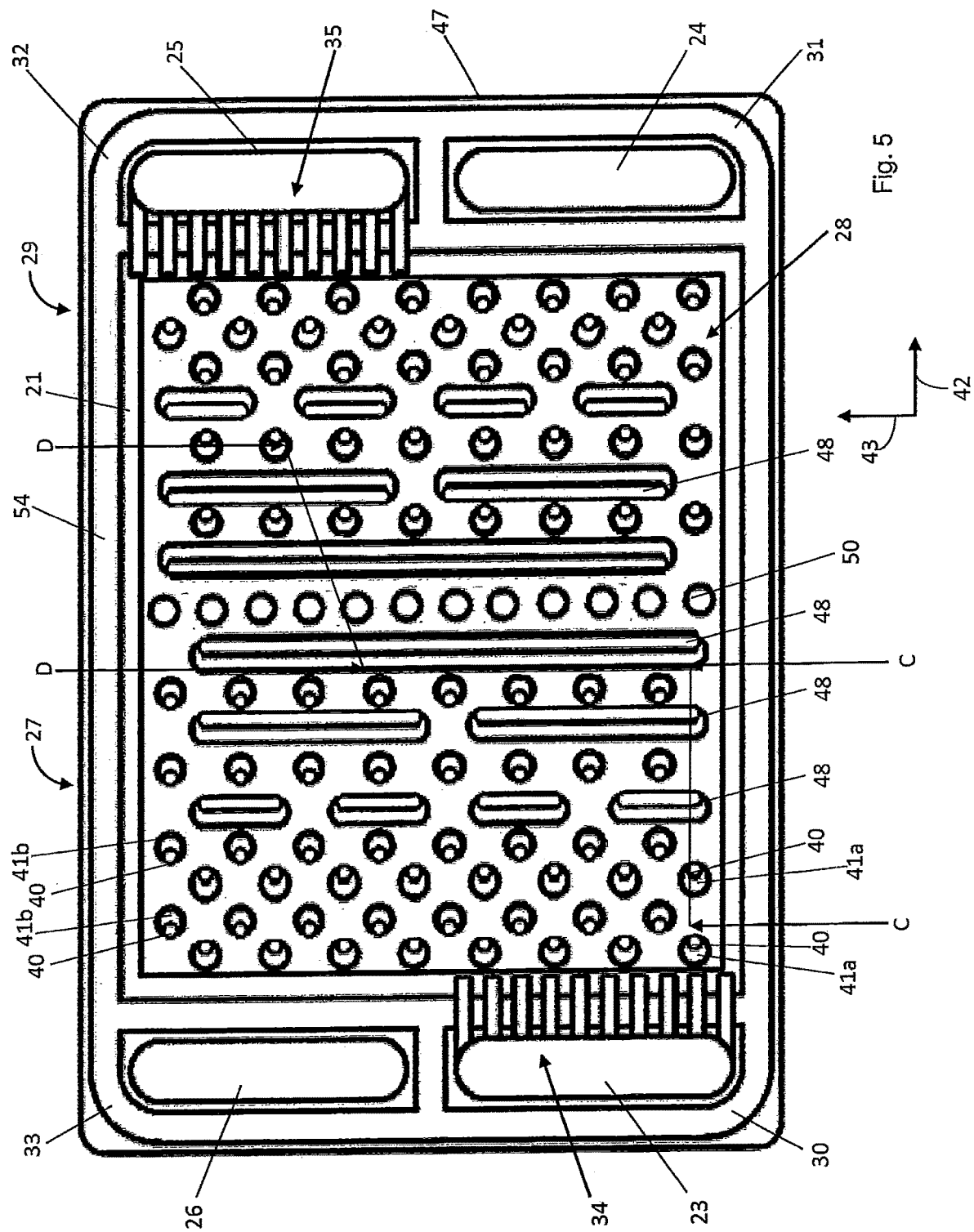
FIG. 5 shows a further embodiment of a flow plate according to the invention for a humidifier.

FIG. 5 shows a further embodiment of a flow plate 47 according to the invention. Sections through the flow plate 47 along the lines of section C-C and D-D shown in FIG. 5 are shown in FIGS. 6b and 6c, wherein the plane of section is oriented in each case perpendicularly to the flat surface plane of the flow plate 47.

The flow plate 47 according to FIG. 5 differs from the flow plate 22 according to FIG. 4 by a partially different embodiment of the flow fields 28, 29 on the flat sides 21, 27. Besides the approximately circular through-openings 40 and the dome-like or half-shell-like guide structures 41a, 41b described in conjunction with the flow plate 22, the flow plate 47 has additional elongate through-openings 48 rounded at the ends and guide structures 49 adjacent to the through-openings 48. The flow fields 28, 29 are fluidically connected to one another on the mutually opposed flat sides 21, 27 of the flow plate 47 via the through-openings 48. Similarly to the through-openings 40, a projection of the through-openings 48 onto the flat surface plane of the flow plate 47 has a non-vanishing area. In FIG. 5 the flat surface plane of the flow plate 47 is oriented parallel to the drawing plane. Depending on the longitudinal extent of the through-openings 48, this area may be for example at least 1 mm$^2$, at least 2 mm$^2$, or at least 3 mm$^2$. In the case of very wide through-openings 48, this area may certainly be more than 10 mm$^2$, or even more than 20 mm$^2$. Typical widths lie in the range of from 0.5 mm to 2.5 mm, however smaller or larger widths, such as 0.5 mm or for example 3.5 mm are also possible.

Similarly to the through-openings 40, the through-openings 48 may be stamped into or out of the metal sheet from which the flow plate 47 is formed. Alternatively, the through-openings 48 may be formed by incisions, in particular non-material-removing incisions, in the flow plate 47. For example, the guide structures 49 formed in one part with the flow plate 47 and moulded into the flow plate 47 form ribs with an open side flank along a longitudinal side. In the embodiment shown in FIG. 5 the guide structures 49 protrude from the first flat side 21 at least by three sheet thicknesses. The through-openings 48 and the ribs forming the guide structure 49 extend in the longitudinal direction over a length that for example is at least 15 percent, at least 30 percent, or at least 70 percent of the length of the shorter longitudinal side of the rectangular flow plate 47. These ribs may in turn have, at least in sections, a convex curvature in relation to the flat side 21, such that the guide structures 49 give the gas a speed component perpendicular to the flat surface plane of the flow plate 47 as said gas flows through the through-openings 48.

The through-openings 48 and the guide structures 49 are oriented approximately transversely to the flow direction of the gas flowing, during operation of the humidifier 1, from the discharge opening 25 serving as gas inlet along the flat sides 21, 27, through the flow fields 28, 29, to the discharge opening 23 serving as gas outlet. In particular, the elongate through-openings 48 and the elongate guide structures 49 are oriented approximately transversely to the shortest straight connecting line between the discharge opening 25 and the discharge opening 23. For example, the elongate through-openings 48 and the elongate guide structures 49 enclose an angle with this shortest straight connecting line between the discharge opening 25 and the discharge opening 23 that here is between 60 degrees and 70 degrees. In principle, the angle can be freely selected, and is preferably greater than 60 degrees. In particular, the size of the angle is dependent on whether a through-opening 48 or guide structure 49 is arranged parallel to one outer edge or at an incline to both outer edges of the flow plate, and on the outer geometry of the flow plate. Due to this design of the through-openings 48 and the guide structure 49, the gas flowing from the discharge opening 25 to the discharge opening 23 can be guided particularly efficiently from the first flow field 28 to the first flat side 21 into the second flow field 29 on the second flat side, or vice versa. Additionally, the flow plate has closed guide structures 50, which each protrude in a dome-like or spherical manner from the flat side 27 of the flow plate, for example by at least three times the sheet thickness. Parallel to the flat surface plane of the flow plate 47, the guide structures 50 have a round cross-section, which decreases with increasing distance from the flat surface plane.

FIG. 7 shows a detail of a flow plate 51, which is a slightly modified variant of the flow plate 22 from FIG. 4. The flow fields 28, 29 of the flow plate 51 from FIG. 7 differ from the flow fields 28, 29 of the flow plate 22 from FIG. 4 in that the through-openings 40 each adjoin the ends of the guide structures 41a, 41b facing the discharge opening 23 serving as gas outlet (not shown). FIG. 7 additionally shows a sectional illustration of the flow plate 51 along the line of section A-A, wherein the plane of section is again oriented perpendicular to the flat surface plane of the flow plate 51, which, as before, runs parallel to the drawing plane. It can also be seen that the through-openings 40 and the guide structures 41a, 41b are arranged periodically along the directions 42, 45. The distances between directly adjacent through-openings 40 and directly adjacent guide structures 41a, 41b are greater here along the direction 42 than along the direction 45.

Figure 8:
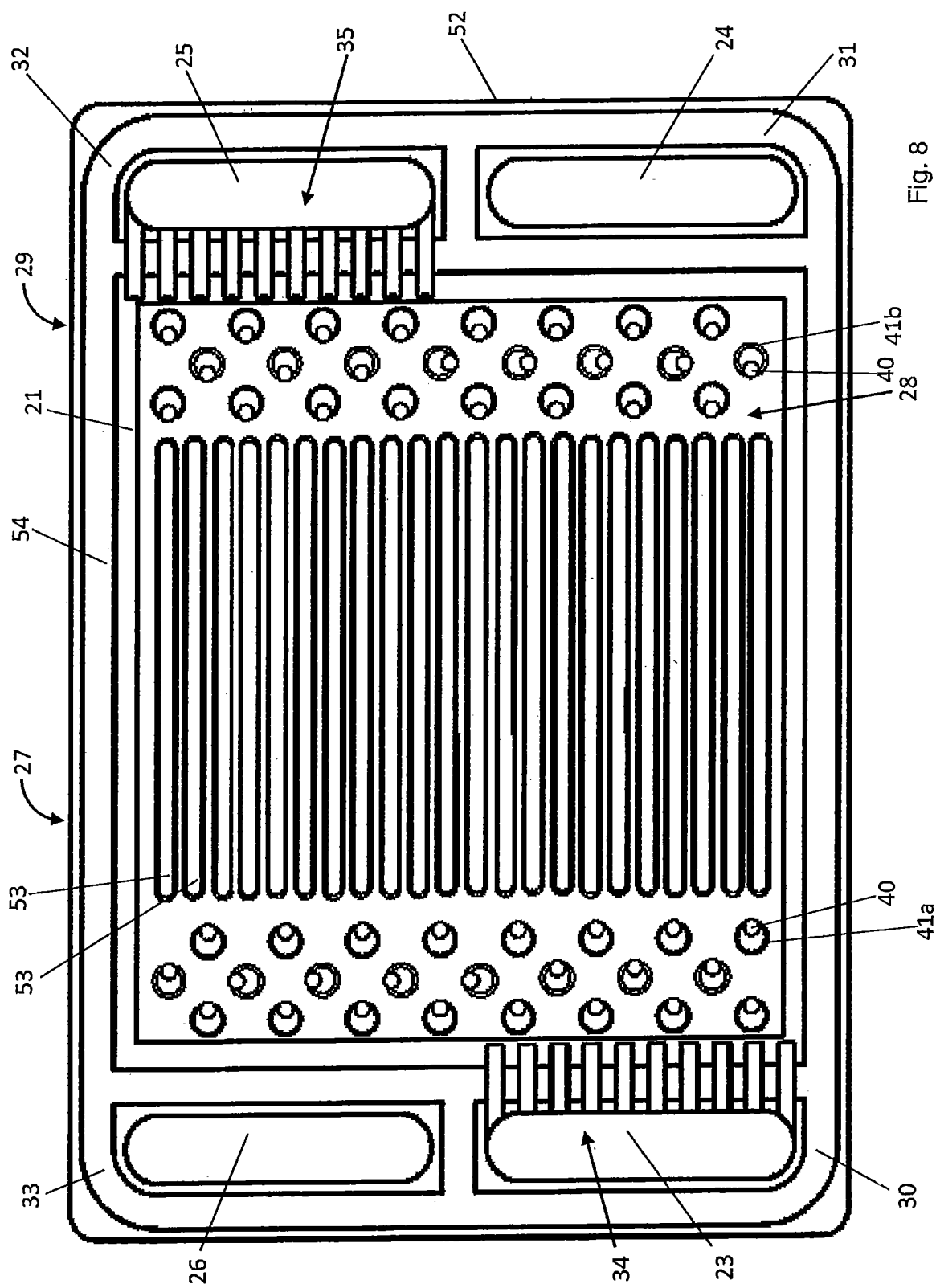
FIG. 8 shows a further embodiment of a flow plate according to the invention for a humidifier.

FIG. 8 shows a flow plate 52 which is a further modification of the flow plate 22 from FIG. 4. The flow plate 52 from FIG. 8 differs from the flow plate 22 according to FIG. 4 in that the flow fields 28, 29 on the flat sides 21, 27 have channel structures 53 in addition to the through-openings 40 and the guide structures 41a, 41b. The channel structures 53 are moulded into the metal sheet from which the flow plate 52 is formed, for example by embossing or by deep drawing. The channel structures 53 are designed to guide gas from the discharge opening 25 serving as gas inlet to the discharge opening 23 serving as gas outlet, through the flow fields 28, 29. Furthermore, some guide structures 41a', 41b' in the flow plate 52 are arranged rotated by 90° relative to the other guide structures 41a, 41b, and similarly the through-openings 40' arranged in the region of these guide structures 41a', 41b' are rotated by 90° relative to the other through-openings 40. As a result, the gas flows can be guided purposefully to or from the outer regions of the flow fields 28, 29. It is also possible to arrange various through-openings and guide structures at many different angles relative to one another, in order to attain an optimal flow and mixing of the gas flows.

Figure 9:
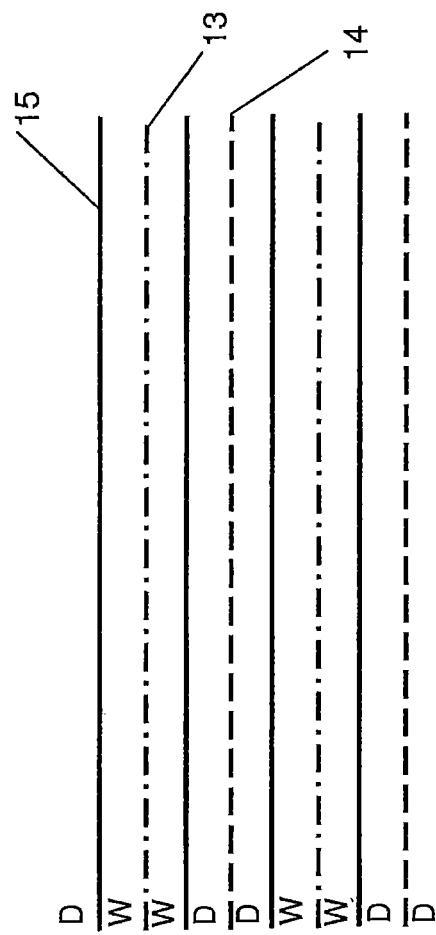
FIG. 9 shows a schematic illustration of the monoplanar design of a humidifier according to the invention.

FIG. 9 by contrast shows a monopolar design of a humidifier module or a detail of a humidifier that has two different flow plates 13, 14. The flow plates 13 are arranged between two flow spaces of moist gas ("W"), and the flow plates 14 are arranged between two flow spaces of drier gas ("D"). The flow plates 13, 14 each have passages, such that the two adjacent flow spaces are not completely separated from one another. Instead of two different flow plates, just a single flow plate may also be used in some circumstances, said single flow plate being installed with different orientations, such that 13 and 14 still differ from one another.

The invention claimed is:

1. A humidifier comprising:
a layer comprising a water exchange memberane; and
at least two flow plates comprising:
flow fields on both mutually opposed flat sides of the flow plate, and
a plurality of through-openings in the region of the flow fields, wherein the through-openings are formed in such a way that a perpendicular projection of the through-openings onto a plane oriented parallel to the flat surface plane of the flow plate has a non-vanishing area formed by guide structures, such that gas passing through the through-openings is at least partially mixed perpendicularly to the flat surface plane of the flow plate by gas guided in the flow fields,
the guide structures extending outward from the plane of the flow plate, a portion of the guide structures supporting the layer comprising a water exchange membrane, and at least one of the portions of the guide structures oriented in a direction of the plane of the flow plate.

2. The flow plate according to claim 1, wherein the guide structures, in the region of the flow fields, convey gas flowing along the plate surfaces through the through-openings to the flow field or into the flow field on the opposite flat side of the flow plate, and promote a mixing of the gas perpendicular to the flat surface plane of the flow plate.

3. The flow plate according to claim 1, wherein the flow plate is formed from metal.

4. The flow plate according to claim 1, wherein the flow plate is formed as a metal sheet with a thickness of at most 150 μm, the thickness determined perpendicular to the flat surface plane of the flow plate.

5. The flow plate according to claim 1, wherein the flow plate is formed in one layer.

6. The flow plate according to claim 2, wherein the flow plate and the guide structures are formed in one part.

7. The flow plate according to claim 2, wherein the guide structures are moulded, including stamped, into the flow plate.

8. The flow plate according to claim 2, wherein the guide structures each reach as far as the through-openings.

9. The flow plate according to claim 1, wherein the through-openings are at least partially stamped in the flow plate.

10. The flow plate according to claim 1, wherein the through-openings are formed by incisions in the flow plate.

11. The flow plate according to claim 10, wherein the incisions form the guide structures, and regions of the guide structures are bent out from the flat surface plane of the flow plate in order to form the through-openings, and the regions are oriented at least partially perpendicularly to the flat surface plane of the flow plate.

12. The flow plate according to claim 2, wherein the guide structures each enclose, at least in sections, an angle of at least 45 degrees with the flat surface plane of the flow plate.

13. The flow plate according to claim 2, wherein the guide structures are formed as ribs which each have an open side flank.

14. The flow plate according to claim 2, wherein the at least one of the portions of the guide structures oriented in the direction of the plane of the flow plate are at ends of the guide structures protruding from the flow plate, and the at least one of the portions of the guide structures are bent over towards the flat surface plane of the flow plate.

15. The flow plate according to claim 2, wherein said guide structures comprise first guide structures, which protrude from the flow plate on the first flat side of the flow plate, and second guide structures, which protrude from the flow plate on the second flat side of the flow plate opposite the first flat side.

16. The flow plate according to claim 15, wherein the through-openings and/or the guide structures are arranged at periodic distances from one another.

17. The flow plate according to claim 16, wherein the through-openings and/or the guide structures are arranged at periodic distances from one another parallel to the flat surface plane of the flow plate along a first direction and along a second direction.

18. The flow plate according to claim 17, wherein a first distance between adjacent through-openings and/or adjacent guide structures determined along the first direction, is different from a second distance between adjacent through-openings and/or adjacent guide structures determined along the second direction.

19. The flow plate according to claim 18, wherein the first direction and the second direction are perpendicular to one another.

20. The flow plate according to claim 19, wherein the first guide structures protruding from the first flat side of the flow plate and the second guide structures protruding from the second flat side of the flow plate are arranged alternately along the first direction and/or along the second direction.

21. The flow plate according to claim 1, wherein the flow fields have channel structures.

22. The flow plate according to claim 2, wherein the guide structures improve mixing of gas guided along the plate surface, and the guide structures are formed with a portion parallel to the flat surface plane of the flow plate having a variable cross section along a direction perpendicular to the flat surface plane of the flow plate.

23. The flow plate according to claim 1, further comprising discharge openings for the passage of a gas to be humidified and a humidified gas or a gas to be dehumidified and a dehumidified gas through the flow plate, wherein the discharge openings are fluidically connected to the flow fields.

* * * * *